(12) United States Patent
Hansen

(10) Patent No.: US 10,060,412 B2
(45) Date of Patent: Aug. 28, 2018

(54) APPARATUS FOR ADJUSTING THE YAW OF A WIND TURBINE

(71) Applicant: ROMO Wind AG, Zug (CH)

(72) Inventor: Jesper Kjaer Hansen, Ebeltoft (DK)

(73) Assignee: ROMO Wind AG, Zug (CH)

( * ) Notice: Subject to any disclaimer, the term of this patent is extended or adjusted under 35 U.S.C. 154(b) by 275 days.

(21) Appl. No.: 14/377,054

(22) PCT Filed: Jan. 30, 2013

(86) PCT No.: PCT/EP2013/051765
§ 371 (c)(1),
(2) Date: Aug. 6, 2014

(87) PCT Pub. No.: WO2013/117470
PCT Pub. Date: Aug. 15, 2013

(65) Prior Publication Data
US 2014/0348650 A1    Nov. 27, 2014

Related U.S. Application Data

(60) Provisional application No. 61/596,283, filed on Feb. 8, 2012.

(30) Foreign Application Priority Data

Feb. 8, 2012    (EP) .................................... 12154393
Sep. 27, 2012   (DK) ................................. 2012 70591

(51) Int. Cl.
F03D 7/02          (2006.01)
F03D 7/04          (2006.01)

(52) U.S. Cl.
CPC ........... *F03D 7/0204* (2013.01); *F03D 7/042* (2013.01); *Y02E 10/723* (2013.01)

(58) Field of Classification Search
CPC ............................. F03D 7/0204; F03D 7/042
See application file for complete search history.

(56) References Cited

U.S. PATENT DOCUMENTS 7,347,668 B2 * 3/2008 Pedersen ............... F03D 7/0204
                                                        416/1
7,550,862 B2 * 6/2009 Altemark ............... F03D 7/0204
                                                        290/44

(Continued)

FOREIGN PATENT DOCUMENTS

CA         2693802 A1    7/2011
DE    102009026372 A1    2/2011

(Continued)

OTHER PUBLICATIONS

International Search Report and Written Opinion for PCT/EP2013/051765, dated Apr. 24, 2013.

*Primary Examiner* — Richard Edgar
(74) *Attorney, Agent, or Firm* — Dinsmore & Shohl LLP

(57) ABSTRACT

The invention regards an apparatus for adjusting the yaw of a wind turbine adapted for mounting on a wind turbine comprising, a system for measuring the wind direction adapted, via a control signal, to control the yaw angle of the wind turbine based on the wind direction, and a wind sensor system adapted to determine the yaw error of the wind turbine, and means for modifying the control signal based on the yaw error determined by the wind sensor system.

21 Claims, 3 Drawing Sheets

(56) References Cited

U.S. PATENT DOCUMENTS

| | | | |
|---|---|---|---|
| 2010/0066087 A1* | 3/2010 | Hayashi | F03D 7/0204 290/44 |
| 2011/0101691 A1 | 5/2011 | Hashimoto et al. | |
| 2012/0112460 A1* | 5/2012 | Kjaer | F03D 7/046 290/44 |
| 2012/0133138 A1* | 5/2012 | Sorensen | F03D 7/028 290/44 |

FOREIGN PATENT DOCUMENTS

| | | |
|---|---|---|
| EP | 1733241 A1 | 12/2006 |
| EP | 2048507 A2 | 4/2009 |
| WO | 2011150942 A1 | 12/2011 |
| WO | 2012000513 A2 | 1/2012 |

* cited by examiner

APPARATUS FOR ADJUSTING THE YAW OF A WIND TURBINE

CROSS-REFERENCE TO RELATED APPLICATIONS

This application is the U.S. National Phase of PCT/EP2013/051765 filed Jan. 30, 2013, which claims priority of European Patent Application 12154393.8 filed Feb. 8, 2012; U.S. Provisional Patent Application 61/596,283 filed Feb. 8, 2012; and Danish Patent Application PA 2012 70591 filed Sep. 27, 2012.

FIELD OF INVENTION

The invention relates to an apparatus and method for adjusting the yaw of a wind turbine.

BACKGROUND OF THE INVENTION

In a wind turbine it is essential to control the orientation of the wind turbine rotor in relation to the wind—the so called "yaw". A conventional wind turbine has a nacelle, mounted on a tower, where the nacelle can be appropriately rotated towards the wind via a yaw system. The yaw is also known as the azimuth. The nacelle has a generator connected via a shaft to the wind turbine rotor, enabling the yaw drive to appropriately control the orientation of the rotor. The optimal performance of the wind turbine is obtained when the rotor shaft is parallel with the wind direction, which maximises the power output and/or minimises the loads. If this optimal position is not obtained the wind turbine is said to have a "yaw error". The yaw error is expressed as the size of the angle it deviates from the optimal position.

Conventionally, one or more wind vanes and/or sonic wind sensors are placed on the wind turbine nacelle behind the rotor, where their wind direction measurements as electronic signals are communicated to the wind turbine control system. Based on these signals, the control system activates the yaw drive motor and adjusts the turbine yaw accordingly. Mechanical wind vanes and sonic wind sensors can be used and are known in the art.

The position of the wind vanes and/or sonic wind sensors on the nacelle behind the wind turbine rotor is far from ideal, as they will measure the wind after it has passed the rotor, when the wind turbine is in operation. The measurements are therefore heavily influenced by the turbulence generated by the rotor as well as by other aerodynamic effects caused by the nacelle. In addition, buildings, trees, and neighbouring wind turbines can significantly influence the wind direction readings depending on the wind direction. This means that the wind vane and/or sonic wind sensors will report incorrect information to the wind turbine control system and hence produce a yaw error. This yaw error depends on a plurality of factors, among them; the wind speed, the wind direction, the landscape, the design of the wind turbine, the design of the wind vane and/or sonic wind sensors, as well as the wind turbine control system yaw algorithm.

Accordingly, even a correct calibration of the wind vane and/or sonic wind sensor will, at least under certain wind conditions, impose a yaw error on the wind turbine and therefore not make the wind turbine perform optimally.

SUMMARY OF THE INVENTION

Considering the prior art described above, it is an object of the present invention to provide a device, which reduces the yaw error of a wind turbine resulting in reduced loads and/or more production from the turbine.

The object can be achieved by means of an apparatus for adjusting the yaw of a wind turbine adapted for mounting on a wind turbine comprising, a system for measuring the wind direction adapted, via a control signal, to control the yaw angle of the wind turbine based on the wind direction, and a wind sensor system adapted to determine the yaw error of the wind turbine, and means for modifying the control signal based on the yaw error determined by the wind sensor system.

Thus, it is possible to modify the control signal to the wind turbine yaw system, which results in a adjusting of the yaw of the wind turbine. In other words, present invention will manipulate the conventional wind turbine yaw system into changing the yaw angle without changing the yaw control system but only modifying the existing signal from the system for measuring the wind direction.

The wind sensor system can advantageously be an apparatus, which can determine the yaw error in situ. In order to determine the yaw error, the wind sensor system can be a system, which can determine the actual wind direction in relation to the rotor with a higher precision than the wind measuring system. The wind sensor system can therefore be used to modify the control signal.

The means for modifying the control signal does not substitute the control signal from the system for measuring the wind direction to the yaw system but only manipulates or modifies it.

In an example, the wind sensor system will measure the wind direction more accurately than the already installed system for measuring the wind direction and can therefore determine the yaw error with high precision. The reason for not immediately using the more accurate wind direction measured by the wind sensor system and thereby taking over the role of the system for measuring the wind direction is that data may not always be available about how the control system in a wind turbine operates. This lack of information therefore makes it is difficult if not impossible to directly interfere with the wind turbine yaw system. In addition, warranties and responsibilities from the wind turbine manufacturer can become void if changes in the operating system have been made. In other words, the need for interfering with the existing installation can be held at a minimum or completely avoided.

In this way, the present invention can be used to optimise the performance of wind turbines already in operation without changing the operating system or yaw algorithm of the wind turbine.

Preferably, the system for measuring the wind direction comprises a wind vane or a sonic wind sensor. Frequently a mechanical wind vane is used to control the yaw of the wind turbine. Alternatively, a sonic wind sensor can be used to determine the wind direction, such sensors are known in the art. The wind turbine can also use two or more systems for measuring the wind direction in order to determine the wind direction. As an example, the wind turbine can have two wind vanes where one can serve as a backup in the case of failure of the other. In addition, the yaw control system can use the control signal from both wind vanes for example by using average wind direction determined by wind vanes. The wind measuring system can, in an example, be understood as the wind sensor system already existing on the on wind turbine when the present invention is installed.

Preferably, the means for modifying the control signal comprises means for moving or rotating the system for measuring the wind direction in relation to the wind turbine.

In this way it is possible to modify the control signal via the movement or rotation of the system for measuring the wind direction in a mechanical manner without changing anything in the electronic control system of the wind turbine. This has the advantage that it can be used on any wind turbine without directly interfering with its control system or yaw algorithm. In an example, this preferred embodiment is implemented on a wind turbine by detaching its wind vane and re-attaching it on a rotating base, where the rotation of the base is controlled by the wind sensor system.

Advantageously, means for moving or rotating the system for measuring the wind direction comprises a servomechanism, which facilitates the movement or rotation of the system for measuring the wind direction in relation to the wind turbine, preferably the servo mechanism comprises a motor and/or an actuator. The use of a servomechanism is a simple way to rotate or move the system for measuring the wind direction and it is easy to install.

In an embodiment, the servomechanism is spring-loaded adapted to eliminate modifying of the control signal in the absence of a signal or presence of a specific signal from the wind sensor system. This embodiment has the advantage that, if an error in the wind sensor system occurs, then the spring can reset the wind turbine to the original settings of the system for measuring the wind direction. This safety precaution can also be used to avoid that the wind sensor system impose too large corrections of the wind vanes, which may non-acceptable. In addition, during the start-up of the wind turbine it may be advantageous to have the system for measuring the wind direction, for example a wind vane, to perform the initial yaw control and only have the present invention adjusting the yaw of a wind turbine, when the wind turbine is in operation. Thus a spring-loaded mechanism is a simple way to ensure that the signal becomes unmodified when needed even in the case of a malfunction of the wind sensor system.

The above safety precautions can also be executed via control software which controls the servomechanism, so that the system is reverted to the unmodified state in case of specific signal or absence of a signal.

In an embodiment, the wind sensor system comprises a LiDAR or a spinner anemometer. This is an advantage because both a LiDAR (Light Detection and Ranging) and a spinner anemometer provide a more precise wind direction than the nacelle mounted wind vanes. Hence, yaw error information can be determined.

LiDARs can be used for measuring the wind speed and direction in front of the wind turbine rather than on the nacelle position, where the existing wind vanes are currently located. From that information the yaw error can be determined. A LiDAR generates data by detecting the speed of particles suspended in the air flow and it calculates properties of the air flow based the data. The properties can for example be wind speed and direction. An example of a LiDAR is disclosed in WO 2001/150942, which is incorporated by reference in its entirety.

A spinner anemometer is disclosed in EP 1733241 B1, which is incorporated by reference in its entirety. The spinner anemometer can have at least one sensor fixed to the rotor of the wind turbine and an angular sensor, which can determine angular position of the rotor. A circuit is then able to convert the relationship between the output of the at least one sensor and the output of the angular sensor into the speed and direction of the wind experienced by the wind turbine. Thus it can determine the wind turbine yaw error.

In an embodiment, the wind sensor system comprises a sensor and a controller, wherein the controller is adapted to determine errors in the sensor, in which case the wind sensor system will terminate the movement, rotation or modification of the signal from the wind measuring system. The advantage is that if errors are detected in the wind system sensor, the control signal from wind measurement systems is reverted to its original, unaltered state, where the present invention does not adjust the yaw of the wind turbine.

In an embodiment, the means for modifying the control signal further bases the control signal on the power generated by the wind turbine. To further modify the control signal on basis of the power generated by the wind turbine, e.g. the power curve, has the advantage that the yaw of the wind turbine can be adjusted even better, to optimise the power generated and/or reduce the load.

In an embodiment, the means for modifying the control signal further bases the control signal on meteorological data and/or deformation of the wind turbine and/or vibrations in the wind turbine and/or the cardinal direction of the wind turbine. Meteorological data can, for example be; pressure, temperature, precipitation and/or humidity. The meteorological data can be measured on or in the vicinity of the wind turbine. Deformation of the wind turbine can be measured by strain gauges on the wind turbine. For example, strain gauges positioned on the wind turbine, to measure the loads on tower and blades. Vibrations in the wind turbine can be low frequency vibration these vibrations are desirable to minimise as they can be a nuisance to humans and animals. The cardinal direction can be used as a measure for physical changes in the landscape or constructions that change the wind properties. For example, if another wind turbine or a tree is positioned north of the wind turbine the control signal can be modified whenever the wind is coming from the north in order to compensate for the wind disturbances originating from the wind turbine or tree. One of the advantages when using one or more of these different inputs, in addition to the yaw error, to modify the control signal, is that the load on the wind turbine can be reduced and/or the power generated by the wind turbine can be optimised to a greater extend.

The invention can also be viewed as a wind turbine comprising an apparatus for altering the yaw of the wind turbine according to the invention.

The invention also regards a method for adjusting the yaw angle of a wind turbine wherein a wind measuring device controls the yaw of the wind turbine and wherein the controlled yaw angle is modified on the basis of a yaw error determined by a wind sensor system. In this way it is possible to optimise the performance of the wind turbine.

According to the method, the yaw of a wind turbine can be adjusted by electronically modifying the control signal or by mechanically moving or rotating the wind measuring device. These modifications are simple and do not change or interfere with the existing control system of the wind turbine.

Advantageously, mechanically moving or rotating the wind measuring device can be facilitated by a mechanism, preferably a servomechanism. The use of a servomechanism is both simple and relatively easy to install and furthermore, it is relatively cheap.

The wind sensor system in the method, can determine the yaw error by use of a LiDAR or a spinner anemometer. Both a LiDAR and a spinner anemometer can determine the wind direction with higher precision and are therefore preferred when optimising a wind turbine. The LiDAR can be turbine based or ground based.

It is to be understood that the method can be adapted to incorporate any embodiments given above for the apparatus.

The invention can, as an alternative, be viewed as an apparatus for adjusting the yaw of a wind turbine adapted for mounting on a wind turbine, comprising a wind vane comprising a base and a wing, and adapted to control the yaw angle of the wind turbine, based on the angle between a setpoint on the base and the wing, a wind sensor system adapted to determine the yaw error of the wind turbine and means for rotating the base in relation to the wind turbine, based on the yaw error determined by the wind sensor system, hereby enabling a rotatable displacement of the set point in relation to the wind turbine. This embodiment of the invention can be adapted to include any of the embodiments and/or preferred and/or advantageous features described in this document.

The invention can, as a further alternative, be viewed as an apparatus for adjusting the yaw of a wind turbine adapted for mounting on a wind turbine, where the apparatus—guided by a signal from the wind sensor system—directly interfere with moving parts of the wind vane or the sonic measurement mechanisms of the wind measuring system already installed on the wind turbine. This embodiment of the invention can be adapted to include any of the embodiments or preferred and advantageous features described in this application.

DESCRIPTION OF THE DRAWINGS

The invention will in the following be described in greater detail with reference to the accompanying drawings.

DETAILED DESCRIPTION OF THE INVENTION

Figure 1:
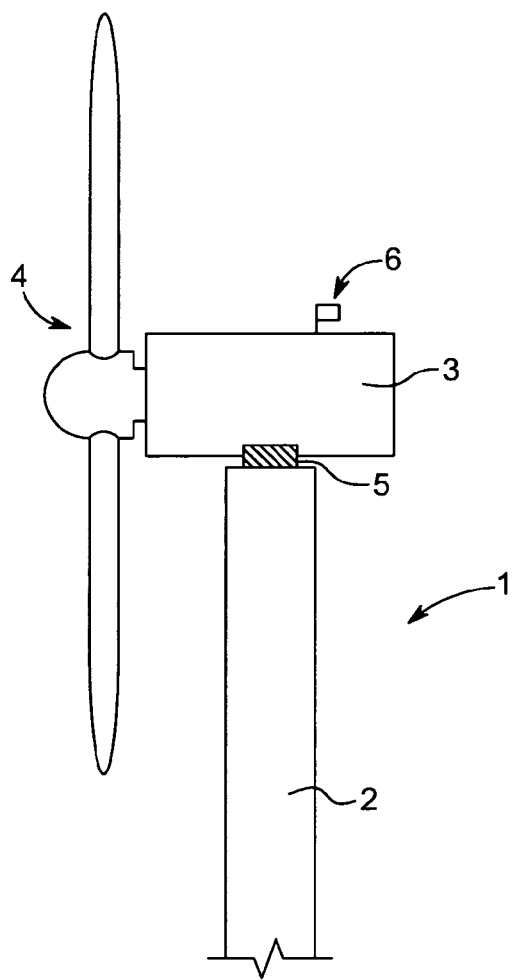
FIG. 1 a schematic view of a wind turbine.

FIG. 1 shows a wind turbine 1 having a tower 2 and a nacelle 3. On the nacelle 3 a rotor 4 is mounted. The nacelle 3 is connected to the tower 2 via the yaw drive 5 which can rotate the nacelle 3 in the horizontal plane. The yaw drive 5 is part of the yaw system that comprises a yaw control device, which control a motor and a breaking mechanism. The yaw control device can get input from the wind turbine control system and/or directly from the wind vane 6. The wind vane 6 has a wing 15 which will change position in relation to the wind direction and a base 12 that is connected to the nacelle. In the embodiment shown in FIG. 1, the wind vane 6 is positioned on the nacelle 3 behind the rotor 4 in relation to the wind when the wind turbine is in operation. This is the conventional position for a wind vane 6. This also means that the wind vane 6 is leeward in relation to the rotor 4 and consequently the changes and disturbance in the wind generated by the rotor 4 will influence on the wind vane 6. This will lead to a yaw error of the wind turbine 1, meaning that the rotor 4 is not directly upwind. During testing of the present invention it was found that most wind turbines have a yaw error between 5 and 20 degrees.

Figure 2:
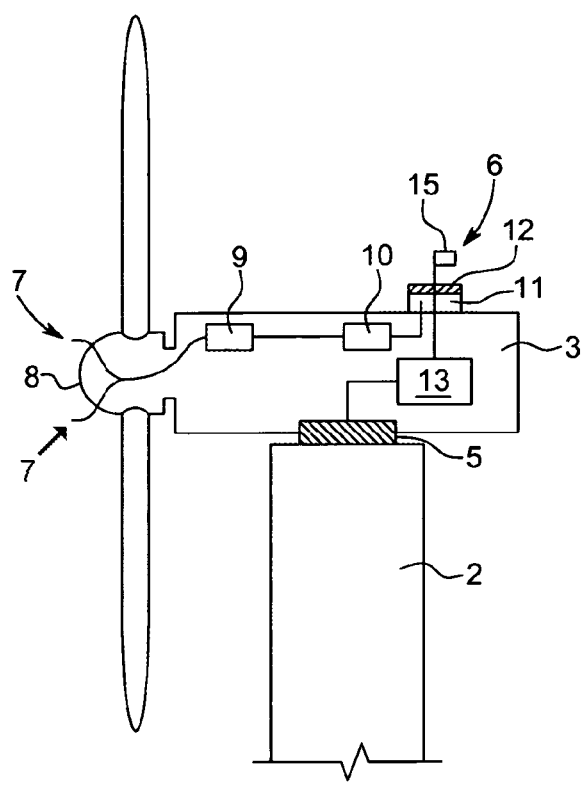
FIG. 2 a schematic view of an embodiment of the invention.

FIG. 2 discloses a part of a wind turbine 1 with a spinner anemometer. A sensor 7, which can determine the wind speed, is placed on the spinner 8, the sensor is connected to a spinner anemometer controller 9. Then the wind direction can be determined, based on the information received from the sensor 7 and an angular sensor, which measures the angular position of the spinner 8 and/or the rotor 4. The spinner anemometer controller 9 can thus calculate the wind direction on the spinner 8 and the rotor 4. If the wind does not hit the rotor directly head on, there is a yaw error and the wind turbine does not use the full force of the wind. In addition, the loads on the wind turbine will be unnecessary large, which will wear out the wind turbine and reduce its lifetime.

The spinner anemometer controller 9 determines if a yaw error is present and then sends a signal to the servo controller 10. The servo controller 10 controls a servomechanism 11, which can rotate the base 12 of the wind vane 6. The servo controller 10 then sends a signal to the servomechanism 11, which rotates the base 12. The wing 15 will then change direction in relation to the base 12. This will be detected by the wind turbine control 13 and a signal will be sent to the yaw drive 5, which will change and appropriately adjust the yaw of the wind turbine 1.

Figure 3A:
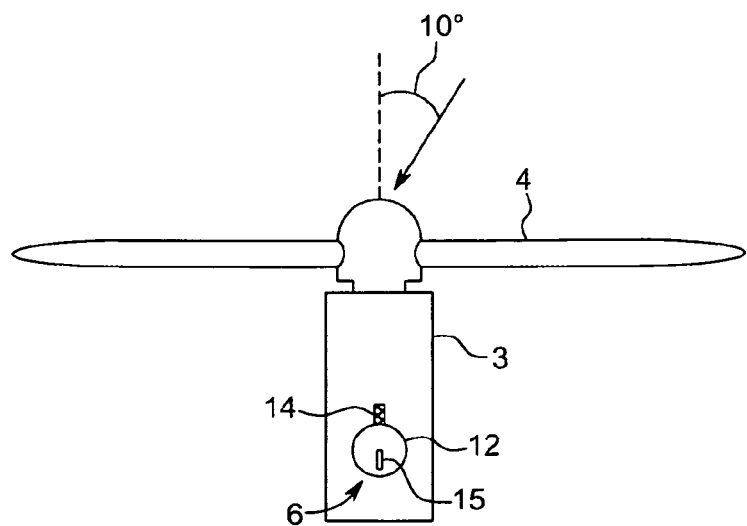
FIG. 3 a schematic view of wind turbine controlled by an embodiment of the invention.
Figure 3B:
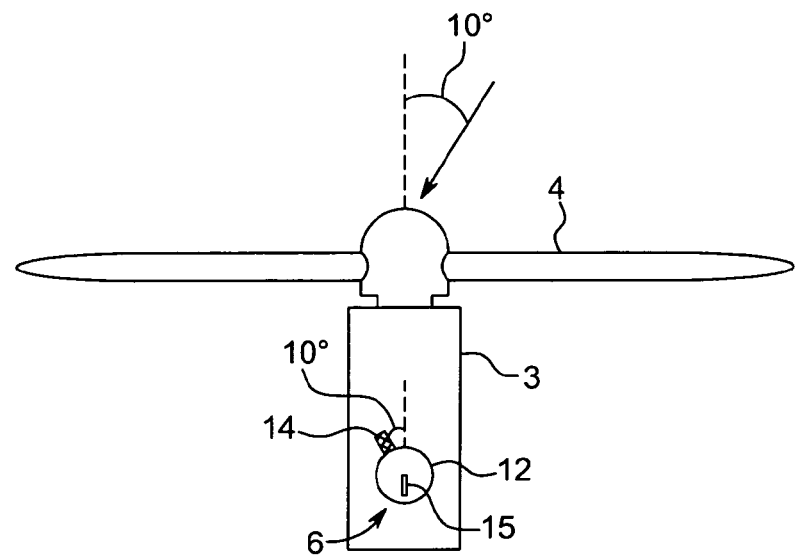
Figure 3C:
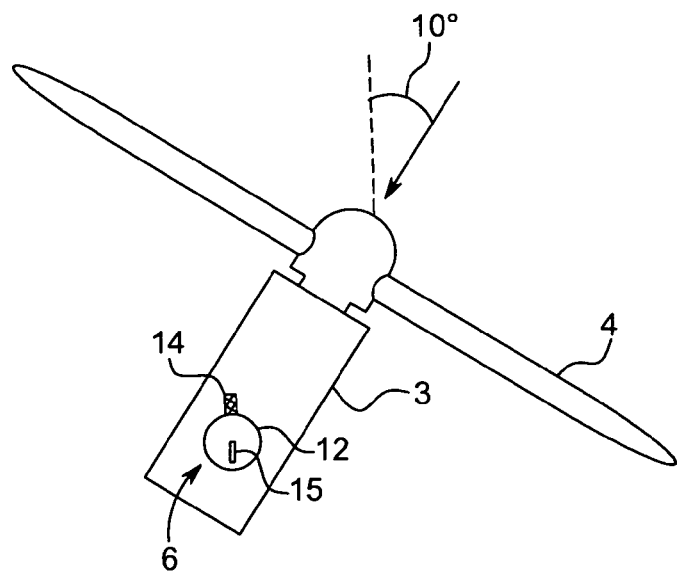

For example, if the spinner anemometer finds that the wind turbine is 10 degrees off, it will rotate the base 10 degrees in the opposite direction, which will result in an activation of the yaw drive, which will rotate the nacelle 10 degrees against the wind and place the rotor so the wind will attack the rotor head on. This is illustrated in FIG. 3. Here the wind turbine has a yaw error of 10 degrees, illustrated as a difference of 10 degrees between the wind (represented as an arrow) and the axle of rotation of the rotor 4 on FIG. 3 a). This is detected by the spinner anemometer and therefore the base 12 is rotated 10 degrees. The original set point 14 of the wind vane 6 on the base 12 is therefore rotated 10 degrees as can be seen on FIG. 3 b). The wind turbine control 13 will then realise that the yaw needs to be corrected as the set point in relation to the wing 15 is changed, the yaw drive 5 is activated and the wind turbine is positioned at the new yaw angle as can be seen in FIG. 3 c).

When the turbine 1 is in a start-up process, the data from the spinner anemometer will sense and report that the rotor 4 does not rotate. This will result in a signal to the servo controller 10 informing it that it needs to reset the wind vane 6 to the original position. This is because the spinner anemometer cannot appropriately determine the wind direction when the rotor 4 is not rotating. If the set point 14 is not reset and the rotor 4 may never be positioned upwind and then never start to rotate. It is therefore preferred that there is a reset function in the servo controller 10, which electronically or mechanically resets the wind vane 6 (e.g. reset set point on the base 12) to an unaltered state when the wind turbine 1 is not in operation or an error message is received from the spinner anemometer controller 9. Further, the servomechanism 11 can be limited to only a certain degree change of the set point, if larger adjustments of the wind turbine yaw not be acceptable. It can for example be limited to 5, 10, 15, 20, 25, 30, 40 degrees of displacement of the set point.

Although not shown in a figure, the base 12 can also be spring-loaded so that when no signal is sent to the servomechanism 11 or an error in the servo system occur, the set point 14 is reverted to the original, non-modified position of the original turbine wind vane (can also be called neutral state). This can be viewed as a failsafe mechanism for the present invention, which ensures that the wind turbine can always be reverted to operate as it was originally installed.

There is little risk for introducing larger loads on the wind turbine when using the present invention. On the contrary the load on the wind turbine is expected to be reduced as the yaw ensures a more correct positioning of the rotor 4.

In the above-mentioned example the wind sensor system is a spinner anemometer. The skilled person will realise that a LiDAR can also be used to determine the wind direction in front of a wind turbine and therefore appreciate that the spinner anemometer can be substituted for a LiDAR. Both nacelle mounted and ground positioned LiDARs are known and can be used.

Instead of the rotating of the base 12 as described above, the invention can also be implemented in a wind turbine by having the spinner anemometer or LiDAR (or any other instrument that can determine the yaw error) modify the signal from the wind vane 6 to the wind turbine control 13 or a signal inside the wind vane 6.

Instead of using a rotating base the invention can also be implemented by using other mechanical devices directly interfering with and modifying the function of the existing turbine wind vanes. A further alternative to rotating the base of the existing wind vane is thus to influence the wing 15 directly. This can be done e.g. by manipulating the wind that attack the wing 15, for example by fins that change the direction of the wind or a fan that can affect the wing 15. The wing 15 can also be attached to springs or elastic devices, which can be used to manipulate the wind vane 6. As yet a further alternative the invention can take over the control of the wind vane 6, meaning that the direction of the wing 15 can be controlled by the signal from the wind sensor system (e.g. spinner anemometer) and thereby disregard the wind acting on the wing 15.

REFERENCE LIST 1 wind turbine
2 tower
3 nacelle
4 rotor
5 yaw drive
6 wind vane
7 sensor
8 spinner
9 spinner anemometer controller
10 servo controller
11 servomechanism
12 base
13 wind turbine control
14 setpoint
15 wing

The invention claimed is:

1. An apparatus for adjusting the yaw of a wind turbine including a rotor, adapted for mounting on a wind turbine, comprising:
   a system for measuring the wind direction operative, via a control signal, to control the yaw angle of the wind turbine based on the wind direction, wherein the system for measuring the wind direction includes a wind vane or a sonic wind sensor, the wind vane or the sonic wind sensor being mounted behind the rotor, and a wind turbine controller configured to determine the control signal with the wind direction as measured behind the rotor and send the control signal to a yaw drive for controlling the yaw angle of the wind turbine;
   a retrofit wind sensor system including a retrofit sensor for measuring a wind speed at the surface of the rotor or a pressure on the surface of the rotor, the retrofit sensor being fixed to the rotor of the wind turbine and operative to determine a yaw error of the wind turbine; and
   the wind sensor system modifying the control signal based on the yaw error determined by the wind sensor system such that the controlled yaw angle is modified when the yaw drive receives the modified control signal.

2. The apparatus according to claim 1, wherein the control signal is an electric signal and the wind sensor system modifies the control signal electronically.

3. The apparatus according to claim 1, wherein the wind sensor system comprises a spinner anemometer.

4. The apparatus according to claim 1, wherein the wind sensor system comprises a controller, wherein the controller is operative to determine error in the sensor in which case it will terminate the modifying the control signal.

5. The apparatus according to claim 1, wherein the wind sensor system modifies the control signal based on the power generated by the wind turbine.

6. The apparatus according to claim 1, wherein the wind sensor system modifies the control signal based on meteorological data and/or deformation of the wind turbine and/or vibrations in the wind turbine and/or the cardinal direction of the wind turbine.

7. An apparatus for adjusting the yaw of a wind turbine adapted for mounting on a wind turbine comprising:
   a system for measuring the wind direction operative, via a control signal, to control the yaw angle of the wind turbine based on the wind direction, and
   a wind sensor system operative to determine the yaw error of the wind turbine, and
   means for modifying the control signal based on the yaw error determined by the wind sensor system,
   wherein the means for modifying the control signal comprises means for moving or rotating the system for measuring the wind direction in relation to the wind turbine.

8. The apparatus according to claim 7, wherein the means for moving or rotating the system for measuring the wind direction comprises a servomechanism, which facilitates the movement or rotation of the system for measuring the wind direction in relation to the wind turbine.

9. The apparatus according to claim 8, wherein the servomechanism is spring-loaded and is operative to eliminate modifying of the control signal in the absence of a signal or presence of a specific signal from the wind sensor system.

10. The apparatus according to claim 8, wherein the servo mechanism comprises a motor and/or an actuator.

11. A method for adjusting the yaw angle of a wind turbine wherein a wind measuring device controls the yaw of the wind turbine, wherein the controlled yaw angle is modified on the basis of a yaw error determined by a wind sensor system and, wherein yaw angle is modified by mechanically moving or rotating the wind measuring device.

12. The method according to claim 11, wherein the movement or rotation is facilitated by a mechanism, which comprises a servomechanism.

13. An apparatus for adjusting the yaw of a wind turbine and adapted for mounting on a wind turbine, comprising:
   a retrofit sensor fixed to a rotor of a wind turbine, wherein the retrofit sensor is operable to determine a wind speed at the surface of the rotor or a pressure on the rotor, and wherein a yaw error is determined based on the output of the retrofit sensor;
   a wind vane mounted on a nacelle behind the rotor of the wind turbine for measuring a wind direction, wherein the wind direction is communicated to a wind turbine controller as an electronic signal; and
   a yaw drive for adjusting the yaw of the wind turbine, wherein the yaw of the wind turbine is adjusted based on a presence of the yaw error, wherein the electronic signal is modified based on the yaw error such that the yaw drive receives a modified control signal.

14. The apparatus according to claim 13, wherein the retrofit sensor is a wind speed sensor.

15. The apparatus according to claim 13, wherein the retrofit sensor is a pressure sensor for determining a pressure on the surface of the rotor.

16. The apparatus according to claim 15, wherein the yaw error is determined based on the pressure on the surface of the rotor.

17. A method for adjusting the yaw angle of a wind turbine including a rotor, wherein a wind measuring device for measuring the wind direction controls the yaw of the wind turbine via a control signal,
wherein the system for measuring the wind direction includes a wind vane or a sonic wind sensor, the wind vane or the sonic wind sensor being mounted behind the rotor, and a wind turbine controller with the wind direction as measured behind the rotor, the wind turbine controller configured to determine the control signal with the wind direction as measured behind the rotor and send the control signal to a yaw drive for controlling the yaw angle of the wind turbine,
wherein the controlled yaw angle is modified on the basis of a yaw error determined by a retrofit wind sensor system including a retrofit sensor for measuring a wind speed or a pressure on the surface of the rotor, the retrofit sensor being fixed to the rotor of the wind turbine, wherein the retrofit wind sensor system modifies the control signal based on the yaw error determined by the retrofit wind sensor system such that the controlled yaw angle is modified when the yaw drive receives the modified control signal.

18. The method according to claim 17, wherein yaw angle is modified by electronically modifying the control signal.

19. The method according to claim 17, wherein the wind sensor system determines the yaw error by use of a spinner anemometer.

20. The method according to claim 17, wherein the controlled yaw angle is further modified on the basis of power generated by the wind turbine.

21. The method according to claim 17, wherein the controlled yaw angle is further modified on the basis of meteorological data and/or deformation of the wind turbine and/or vibrations in the wind turbine and/or the cardinal direction of the wind turbine.

* * * * *